(12) United States Patent
Harold et al.

(10) Patent No.: US 8,318,115 B2
(45) Date of Patent: *Nov. 27, 2012

(54) SYSTEMS AND METHODS FOR HIGH EFFICIENCY REGENERATIVE SELECTIVE CATALYTIC REDUCTION

(75) Inventors: John R. Harold, Worcester, MA (US); James D. Dougherty, Boxford, MA (US)

(73) Assignee: Babcock Power Environmental, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,978

(22) Filed: Jan. 5, 2012

(65) Prior Publication Data

US 2012/0171096 A1 Jul. 5, 2012

Related U.S. Application Data

(63) Continuation of application No. 12/838,908, filed on Jul. 19, 2010, now Pat. No. 8,124,017, which is a continuation-in-part of application No. 12/355,231, filed on Jan. 16, 2009, now Pat. No. 7,758,831, and a continuation-in-part of application No. 11/938,665, filed on Nov. 12, 2007, now Pat. No. 7,494,625, which is a continuation of application No. 10/957,499, filed on Sep. 30, 2004, now Pat. No. 7,294,321.

(60) Provisional application No. 61/056,310, filed on May 27, 2008.

(51) Int. Cl.
*B01D 53/56* (2006.01)
*B01D 53/90* (2006.01)

(52) U.S. Cl. ............ 423/210; 423/239.1; 423/247; 422/129; 422/469; 422/170; 422/171; 422/173; 422/175; 165/4; 165/104.11; 165/104.14; 165/909

(58) Field of Classification Search ............ 423/210, 423/239.1, 247; 422/129, 169, 170, 171, 422/173, 175; 165/4, 104.11, 104.14, 909
See application file for complete search history.

(56) References Cited

U.S. PATENT DOCUMENTS 4,447,333 A 5/1984 Wagener et al.
(Continued)

FOREIGN PATENT DOCUMENTS

DE 3533199 A1 3/1987
(Continued)

OTHER PUBLICATIONS

European Search Report for EP05020884 dated Dec. 19 2005.
(Continued)

*Primary Examiner* — Timothy Vanoy
(74) *Attorney, Agent, or Firm* — Edwards Wildman Palmer LLP; Joshua L. Jones

(57) ABSTRACT

The invention provides a system for regenerative selective catalytic reduction including a catalyst chamber that contains a catalyst for reducing $NO_X$ in a gas stream passing therethrough. The system also includes a reactant injector, first and second heat exchangers, and a valve manifold adapted to direct a substantially continuous gas stream through the heat exchangers and catalyst chamber in such a manner as to flow through the catalyst chamber in the same flow direction during each cycle of the system. The invention also provides a process of regenerative selective catalytic reduction wherein the gas stream through the catalyst chamber flows in the same flow direction during each cycle of the process.

20 Claims, 3 Drawing Sheets

U.S. PATENT DOCUMENTS

| | | | |
|---|---|---|---|
| 4,735,785 A | 4/1988 | Eichholtz et al. |
| 4,770,857 A | 9/1988 | Ludwig |
| 4,877,592 A | 10/1989 | Matros et al. |
| 5,364,259 A | 11/1994 | Matros et al. |
| 5,589,142 A | 12/1996 | Gribbon |
| 5,651,668 A | 7/1997 | Schmid |
| 5,658,541 A | 8/1997 | Matros et al. |
| 5,891,411 A | 4/1999 | Gribbon |
| 5,919,425 A | 7/1999 | Nguyen et al. |
| 6,039,927 A | 3/2000 | Greco |
| 6,183,707 B1 | 2/2001 | Gosselin et al. |
| 6,228,329 B1 | 5/2001 | Garvey |
| 6,673,325 B2 | 1/2004 | Gravel |
| 6,935,105 B1 | 8/2005 | Page et al. |
| 7,017,592 B2 | 3/2006 | Chiles et al. |
| 7,294,321 B2 | 11/2007 | Abrams |
| 7,449,054 B2 | 11/2008 | Rabellino et al. |
| 7,494,625 B2 | 2/2009 | Abrams |
| 7,682,586 B2 | 3/2010 | Harold et al. |
| 7,758,831 B2 | 7/2010 | Abrams et al. |
| 8,124,017 B2 * | 2/2012 | Harold et al. | 422/129 |
| 2005/0118084 A1 | 6/2005 | Cichanowicz |
| 2005/0129601 A1 | 6/2005 | Li et al. |
| 2005/0232838 A1 | 10/2005 | Cichanowicz |
| 2006/0067865 A1 | 3/2006 | Abrams |
| 2008/0050297 A1 | 2/2008 | Harold et al. |
| 2008/0317652 A1 | 12/2008 | Bono et al. |
| 2010/0322834 A1 | 12/2010 | Ito et al. |

FOREIGN PATENT DOCUMENTS

| | | |
|---|---|---|
| DE | 4027329 A1 | 3/1992 |
| DE | 4432316 A1 | 3/1996 |
| EP | 0487886 A1 | 6/1992 |
| EP | 1642635 A1 | 4/2006 |
| JP | 63072327 A | 4/1988 |
| JP | H-09-262434 | 10/1997 |
| JP | 2000274643 A | 10/2000 |
| JP | 2001304531 A | 10/2001 |
| JP | 2004049939 A | 2/2004 |
| WO | WO-9625224 A1 | 8/1996 |
| WO | WO-9947245 A1 | 9/1999 |

OTHER PUBLICATIONS

PCT Search Report with Written Opinion dated Sep. 23 2009 for PCTUS2009045107.
Office Action dated Apr. 26, 2011 for Japanese Patent Application No. JP2005-282980.
Extended Search Report including Supplementary European Search Report, dated Aug. 23, 2011 for EP Application No. EP09816627.5.
International Search Report and Written Opinion issued Mar. 20, 2012 in connection with PCT/US2011/044061.
KIPO Office Action dated May 24, 2012 issued on corresponding Korean Patent Application No. 10-2005-0090323 (English translation).
Patent Abstracts of Japan, JPH 09-262434 in English, 1997.

* cited by examiner

SYSTEMS AND METHODS FOR HIGH EFFICIENCY REGENERATIVE SELECTIVE CATALYTIC REDUCTION

CROSS-REFERENCE TO RELATED APPLICATIONS

This application is a continuation of U.S. patent application Ser. No. 12/838,908 filed Jul. 19, 2010, now U.S. Pat. No. 8,124,017, which is a continuation-in-part of U.S. application Ser. No. 12/355,231, filed Jan. 16, 2009, now U.S. Pat. No. 7,758,831, which in turn claims the benefit of U.S. Provisional Application No. 61/056,310, filed May 27, 2008. U.S. application Ser. No. 12/355,231 is a continuation in part of U.S. application Ser. No. 11/938,665, filed Nov. 12, 2007, now U.S. Pat. No. 7,494,625 which in turn is a continuation of U.S. application Ser. No. 10/957,499, filed Sep. 30, 2004, now U.S. Pat. No. 7,294,321, each of which is incorporated by reference herein in its entirety.

BACKGROUND OF THE INVENTION

1. Field of the Invention

The present invention relates to systems and methods for removing materials from flue gas, and, more particularly, to improved systems and methods for flue gas denitrification (i.e., for removing nitrogen oxides from flue gas) via regenerative selective catalytic reduction (RSCR).

2. Description of Related Art

High-temperature combustion processes and other like technologies serve vital roles in industry; however, often an unfortunate by-product of such processes is the generation and release into the atmosphere of contaminants within outputted flue gas. Among the most notorious of these contaminants are nitrogen oxides (hereinafter referred to as "$NO_x$"), which are classified as pollutants by the EPA, and the output of which has been linked to the generation of smog and so-called acid rain. Thus, it is a common goal of those in industry to reduce to acceptable levels the amount of contaminants such as $NO_x$ within outputted flue gas.

For years, a commonly employed technique for reducing $NO_x$ emissions was to modify the combustion process itself, e.g., by flue gas recirculation. However, in view of the generally poor proven results of such techniques (i.e., $NO_x$ removal efficiencies of 50% or less), recent attention has focused instead upon various flue gas denitrification processes (i.e., processes for removing nitrogen from flue gas prior to the flue gas being released into the atmosphere).

Flue gas denitrification processes are categorized into so-called "wet" methods, which utilize absorption techniques, and "dry" methods, which instead rely upon adsorption techniques, catalytic decomposition and/or catalytic reduction. At present, a widely implemented denitrification process is selective catalytic reduction (SCR), which is a "dry" denitrification method whereby the introduction of a reactant (e.g., $NH_3$) causes reduction of the $NO_x$, which, in turn, becomes transformed into harmless reaction products, e.g., Nitrogen and water. The reduction process in an SCR process is typified by the following chemical reactions:

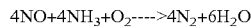

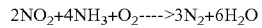

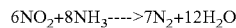

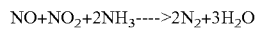

Due to the technology involved in SCR, there is some flexibility in deciding where to physically site the equipment for carrying out the SCR process. In other words, the chemical reactions of the SCR process need not occur at a particular stage or locus within the overall combustion system. The two most common placement sites are within the midst of the overall system (i.e., on the "hot side"), or at the so-called "tail end" of the overall system (i.e., on the "cold side").

Unfortunately, significant problems are encountered in industrial settings with respect to both hot side and cold side SCR installations. For example, hot side SCR processes are not optimal for use in conjunction with wood-fired burners. This is because ash present within the wood contains alkalis, which can cause damage to the catalyst due to deactivating the catalyst surface, either by blinding or chemical reaction. Cold side SCR processes avoid this disadvantage because they are located downstream of the particulate control device, but are plagued by thermal inefficiency due to their reliance on indirect heat exchangers.

Thus, a need exists for a selective catalytic reduction process that can be easily implemented into existing industrial operations, and that allows effective and efficient removal of $NO_x$ from flue gas while achieving high thermal efficiency and minimizing significant installation- and/or operation-related costs.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a regenerative selective catalytic reduction process including providing a gas stream containing $NO_x$ to be treated. The process also includes introducing a reactant into the gas stream and directing the gas stream into contact with a catalyst to cause at least some of the $NO_x$ contained in the gas stream to be reduced. The gas stream is adapted to flow past the catalyst along the same flow direction throughout the process in a substantially continuous manner. The catalyst attains a greater efficiency when the flow is continuous in one direction. The gas stream is heated by directing the gas stream through a first heat exchanger, and the gas stream is cooled by directing the gas stream through a second heat exchanger during a first system cycle. During a second system cycle, the gas stream is heated by directing the gas stream through the second heat exchanger, and the gas stream is cooled by directing the gas stream through the first heat exchanger.

In accordance with a further aspect of the invention, the gas stream can be heated prior to directing the gas stream into contact with the catalyst during each system cycle. The reactant can be introduced after heating the gas. It is also possible to introduce the reactant before heating the gas. Each heat exchanger can include a thermal mass. Also, the gas stream can be further heated by mixing the gas stream with combustion products from a burner after the gas stream obtains heat energy from a heat exchanger.

In accordance with another aspect of the invention, the gas stream can be cooled after the gas stream has been directed into contact with the catalyst. It is also possible for the reactant injection to be continuous. The reactant can include ammonia.

In accordance with still another aspect of the invention, a regenerative selective catalytic reduction process is provided wherein the gas stream includes reactant in an amount less than about ten parts per million after the gas stream has undergone the first system cycle. The gas stream can include reactant in an amount less than about eight parts per million after the gas stream has undergone the first system cycle. It is also envisioned that the gas stream can include reactant in an amount less than about six parts per million after the gas stream has undergone the first system cycle. The gas stream can include reactant in an amount less than about four parts per million after the gas stream has undergone the first system cycle. It is also possible for the gas stream to include reactant in an amount less than about two parts per million after the gas stream has undergone the first system cycle.

The invention also includes a system for regenerative selective catalytic reduction. The system includes a catalyst chamber having an inlet, an outlet and defining a flow path between the inlet and outlet. The catalyst chamber contains a catalyst for reducing $NO_X$ in a gas stream passing therethrough. The system also includes a reactant injector in fluid communication with the system for introducing a reactant into the gas stream upstream from the catalyst chamber as the gas stream passes through the system. A valve manifold is in fluid communication with the inlet and the outlet of the catalyst chamber. The valve manifold is adapted to direct a substantially continuous gas stream through the catalyst chamber from the inlet to the outlet during each cycle of the system operation along the same flow direction. A first heat exchanger is in fluid communication with the valve manifold. This first heat exchanger is adapted to exchange energy with a gas stream passing therethrough. There is also a second heat exchanger in fluid communication with the valve manifold. The second heat exchanger is also adapted to exchange energy with a gas stream passing therethrough. The valve manifold is further adapted to heat a gas stream passing through the system by directing the gas stream through the first heat exchanger, and to cool the gas stream by passing the gas stream through the second heat exchanger, during a first system cycle. During a second system cycle, the valve manifold is adapted to heat a gas stream passing through the system by directing the gas stream through the second heat exchanger, and to cool the gas stream by passing the gas stream through the first heat exchanger.

In further accordance with the invention, each system cycle can last from about one minute to more than three minutes in duration. The reactant injector can be adapted to inject reactant into a gas stream passing through the system proximate the inlet of the catalyst chamber.

In accordance with another aspect of the invention, each of the first and second heat exchangers can include a heater and a vessel that includes a thermal mass adapted to permit a gas stream to pass therethrough. The heater can include any of a gas burner, a burner utilizing any suitable fuel such as liquid fuel, a steam heater, or any other suitable type of heater.

In further accordance with the invention, the system can further include third and fourth heat exchangers in fluid communication with the valve manifold. The third and fourth heat exchangers can be adapted to exchange energy with a gas stream passing therethrough. The system can further comprise a second catalyst chamber in fluid communication with the valve manifold. The second catalyst chamber can have an outlet, an inlet, and can define a flow path between the inlet and the outlet. The second catalyst chamber can contain a catalyst for reducing $NO_X$ in a gas stream passing therethrough. Those skilled in the art will readily appreciate that any suitable number of heat exchangers can be used without departing from the spirit and scope of the subject invention.

In accordance with yet another aspect of the invention, the system can further include a control system to control the valve manifold to adjust the flow path of a gas stream passing through the system during a plurality of cycles of system operation. The control system can include a processor and a machine readable program on a computer readable medium containing instructions for controlling the valve manifold.

In accordance with still another aspect of the invention, the treated gas exiting the system can include reactant in an amount less than about ten parts per million. The treated gas exiting the system can include reactant in an amount less than about eight parts per million. It is possible for the treated gas exiting the system to include reactant in an amount less than about six parts per million. It is also envisioned that the treated gas exiting the system can include reactant in an amount less than about four parts per million. Moreover, the treated gas exiting the system can include reactant in an amount less than about two parts per million.

It is to be understood that both the foregoing general description and the following detailed description are exemplary and are intended to provide further explanation of the invention claimed. These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENT

Reference will now be made in detail to the present preferred embodiments of the invention, an example of which is illustrated in the accompanying drawings. The process and corresponding steps of the invention will be described in conjunction with the detailed description of the system.

The devices and processes presented herein may be used for reducing $NO_X$ emissions in industrial and power generation plant equipment. Many of the concepts herein are explained further in U.S. Patent Application Pub. No. 2006/0067865, incorporated herein in its entirety. The present invention is particularly suited for reducing $NO_X$ out of flue gases prior to release into the atmosphere, in high-temperature combustion applications such as power plants, boilers, industrial machinery, and other similar equipment.

In accordance with the invention, a system for regenerative selective catalytic reduction is provided including a catalyst chamber having an inlet and an outlet, with a flow path between the inlet and the outlet. The catalyst chamber contains a catalyst for reducing $NO_X$ in a gas stream passing therethrough. The system also includes a reactant injector in fluid communication with the system for introducing a reactant into the gas stream upstream from the catalyst chamber as the gas stream passes through the system. There is a valve manifold in fluid communication with the inlet and outlet of the catalyst chamber, wherein the valve manifold is adapted to direct a substantially continuous gas stream through the catalyst chamber from the inlet to the outlet during each cycle of system operation along the same flow direction. A first heat exchanger is in fluid communication with the valve manifold. The first heat exchanger is adapted to exchange energy with a gas stream passing therethrough. There is also a second heat exchanger in fluid communication with the valve manifold. The second heat exchanger is also adapted to exchange energy with a gas stream passing therethrough. The valve manifold is further adapted to heat a gas stream passing through the system by directing the gas stream through the first heat exchanger, and to cool the gas stream by passing the gas stream through the second heat exchanger during a first system cycle. During a second system cycle, the valve manifold is adapted to heat a gas stream passing through the system by directing the gas stream through the second heat exchanger, and to cool the gas stream by passing the gas stream through the first heat exchanger.

Figure 1:
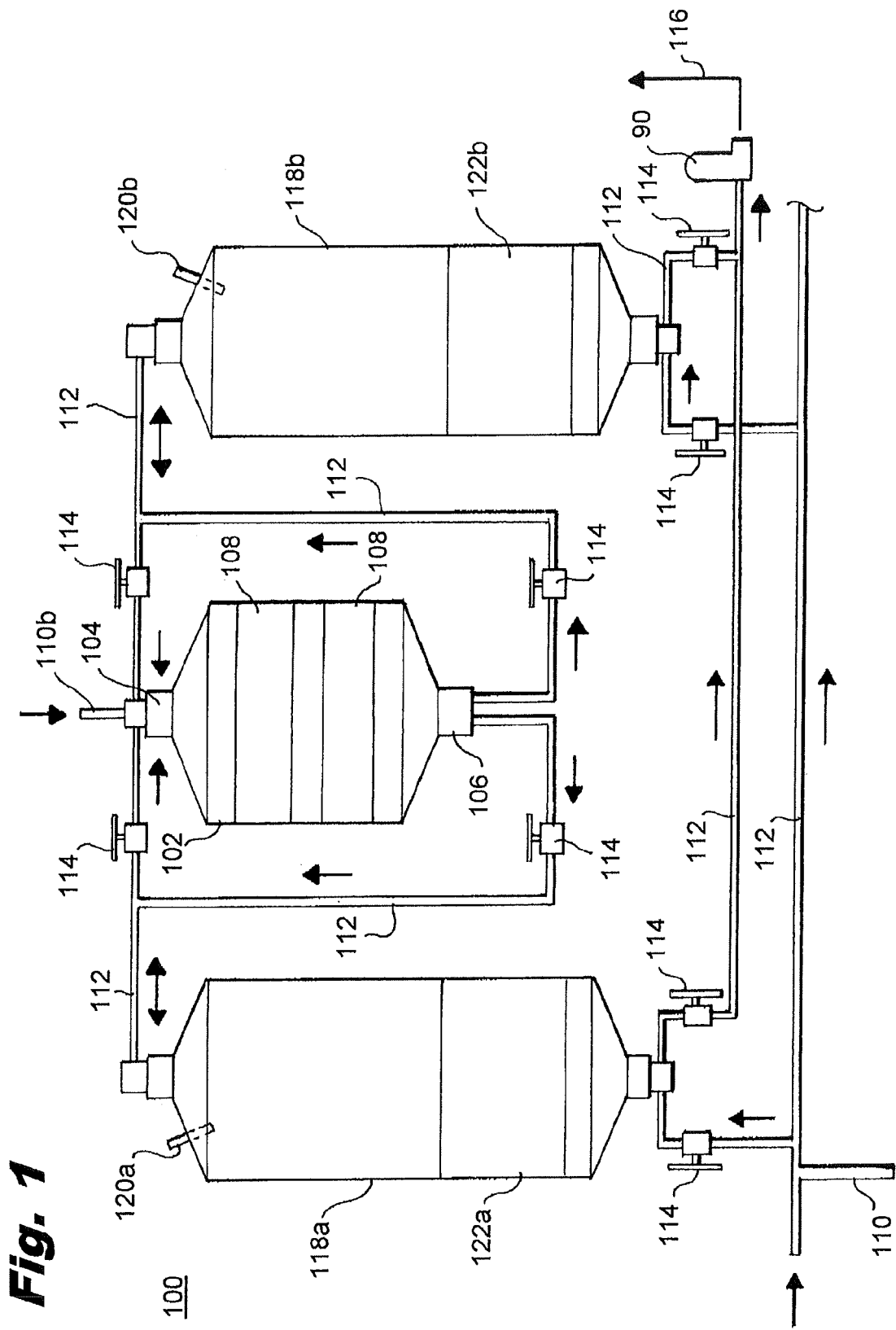
FIG. 1 is a schematic of a portion of a first representative embodiment of a system for high efficiency regenerative selective catalytic reduction in accordance with the present invention, wherein flow is always in the same direction through the catalyst chamber but wherein flow reverses through the heat exchangers from cycle to cycle.

For purpose of explanation and illustration, and not limitation, a partial view of an exemplary embodiment of the system for regenerative selective catalytic reduction (hereinafter "RSCR") in accordance with the invention is shown in FIG. 1 and is designated generally by reference character 100. Other embodiments of a system for RSCR in accordance with the invention, or aspects thereof, are provided in FIGS. 2-3, as will be described. The specific location of system 100 within an industrial setting can vary; however, according to a currently preferred embodiment of the present invention, RSCR system 100 is located at the so-called "tail end" (i.e., "cold side") of the industrial equipment. Other exemplary locations for system 100 include, but are not limited to so-called "hot side" locations, e.g., "hot side, low dust."

In accordance with the invention, a catalyst chamber is provided having an inlet, an outlet, and defining a flow path between the inlet and the outlet. The catalyst chamber contains a catalyst for reducing $NO_X$ in a gas stream passing therethrough.

For purposes of illustration and not limitation, as embodied herein and as depicted in FIG. 1, system 100 is provided with a catalyst chamber 102. Catalyst chamber 102 has an inlet 104 and an outlet 106. There is a flow channel defined through catalyst chamber 102 so that a gas stream can flow generally from inlet 104, through catalyst chamber 102, and exit through outlet 106.

Catalyst chamber 102 also includes two catalyst areas 108. Catalyst chambers 108 serve to lower the temperature requirements for reduction of $NO_X$. The result is that the reduction process requires less energy and, in turn, renders the RSCR process more economical.

When gas enters (i.e., flows through) each catalyst area 108, catalytic reduction occurs whereby the $NO_X$ within the $NO_X$-containing gas is converted to harmless constituents in accordance with the following exemplary reactions, wherein it is noted that other reactions may occur in lieu of or in addition to these:

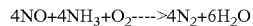

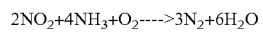

Certain side reactions also may occur during the catalysis process, such as:

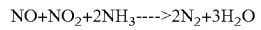

The number of catalyst areas 108 can vary; however, according to a currently preferred embodiment of the present invention, and as shown in FIGS. 1-7, catalyst chamber 102 includes two catalyst areas 108.

Catalyst areas 108 may be made of a variety of materials and can assume a variety of shapes and configurations. It should be noted that catalyst areas 108 can, but need not be constructed of the same materials—that is, some but not all of the catalyst areas can be made of the same combination of materials, or each of the catalyst areas can be made of a different combination of materials.

According to a currently preferred embodiment of the present invention, each catalyst area 108 is made of ceramic material and has either a honeycomb or plate shape. The ceramic material generally is a mixture of one or more carrier materials (e.g., titanium oxide) and active components (e.g., oxides of vanadium and/or tungsten). A layer of precious metal catalyst containing platinum, palladium or rhodium can be added to oxidize carbon monoxide or various VOCs. Catalyst areas 108 also can take in the shape of one or more beds/layers, with the number of beds generally ranging from two to four, both encompassing.

Figure 2:
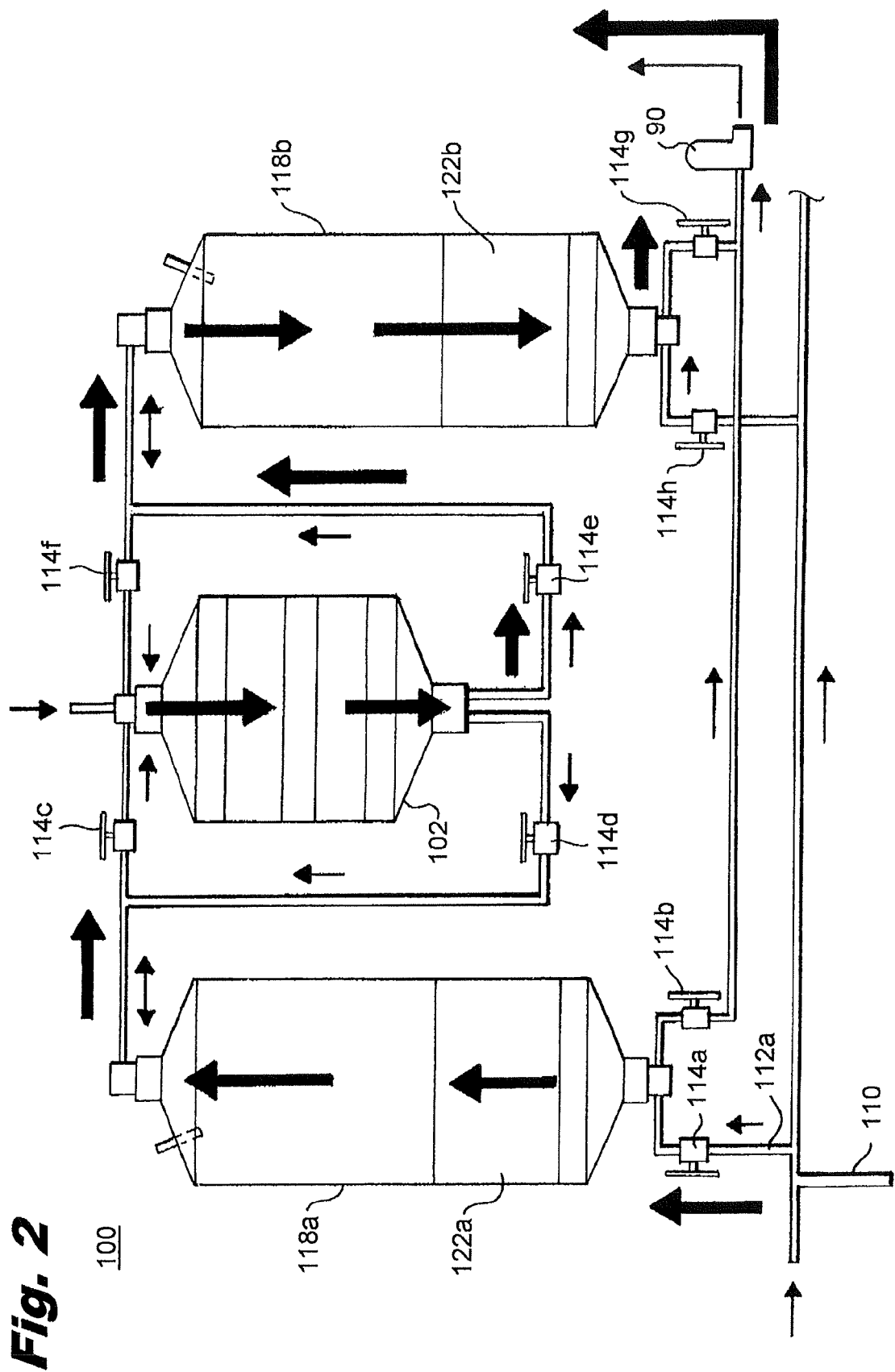
FIG. 2 is a schematic of the system of FIG. 1 in accordance with the present invention, showing the flow of gas through the system during a first cycle.
Figure 3:
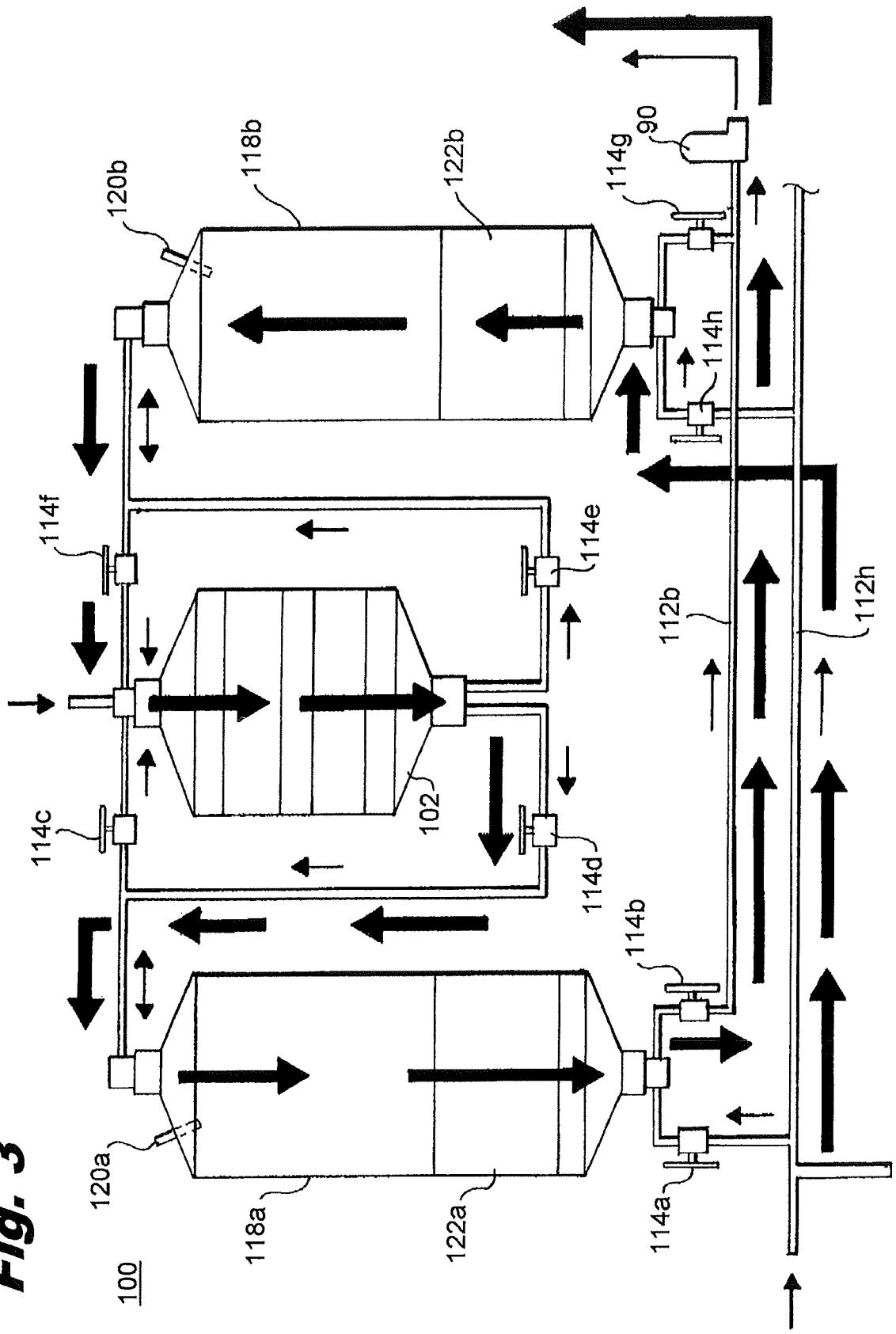
FIG. 3 is a schematic of the system of FIG. 1 in accordance with the present invention, showing the flow of gas through the system during a second cycle.

It should be noted that although FIGS. 1-3 depict the catalyst areas 108 as being substantially aligned with each other, and although such arrangements can occur, this arrangement is not a requirement of the present invention. In other words, catalyst areas 108 are not required to be aligned with each other.

In further accordance with the invention, a reactant injector is provided for introducing a reactant into the gas stream. The reactant injector introduces the reactant upstream from the catalyst chamber as the gas stream passes through the system.

For purposes of illustration and not limitation, as embodied herein and as depicted in FIG. 1, system 100 includes a reactant injector 110. Reactant injector 110 introduces a reactant into the system. Reactant injector 110 is located upstream of catalyst chamber 102 so that the reactant can mix with the $NO_X$-containing gas prior to entering catalyst chamber 102. In a preferred embodiment, reactant injector 110b is located as shown in FIG. 1, so that the reactant is introduced into the gas stream before the gas stream enters any other component of system 100. However, also shown in FIG. 1 is alternate reactant injector 110, located immediately upstream of catalyst chamber 102 to introduce the reactant just prior to the gas stream entering catalyst chamber 102. Besides these two locations, reactant injector 110 can be located in any other suitable location, permitting introduction of the reactant prior to catalyst chamber 102.

According to a currently preferred embodiment of the present invention, one reactant is added/introduced to the $NO_X$-containing gas, and that reactant is ammonia (i.e., $NH_3$). Other suitable reactants include, but are not limited to, methane, propane, and ammonium hydroxide ($NH_4OH$ also called aqueous ammonia). Those skilled in the art will readily appreciate that any other suitable reactant can be used without departing from the spirit and scope of the invention.

For purposes of illustration, and not limitation, as depicted in FIG. 1, system 100 includes a valve manifold in fluid communication with the inlet and the outlet of the catalyst chamber. The valve manifold is adapted to direct a substantially continuous gas stream through the catalyst chamber from the inlet to the outlet during each cycle of system operation along the same flow direction.

The valve manifold can take on a variety of forms. For purposes of illustration only, as depicted in FIG. 1, the valve manifold can include a system of conduits 112 and valves 114. The conduits 112 and valves 114 direct the gas stream through the various components of system 100 in cycles, as will be described below in detail, and eventually out the flue 116. One or more gas movement influencing devices 90 (e.g., fans/pumps) are in communication with the system through the valve manifold to help draw the gas stream through the various components of system 100 and out the flu. By way of further example, for purposes of illustration only, as illustrated in FIGS. 4-7, the valve manifold can take on other alternative configurations without departing from the spirit and scope of the invention, as will be readily appreciated by those of ordinary skill in the art. One or more gas movement influencing devices 90 can be located upstream and/or downstream of system 100 as long as there is enough differential pressure provided to overcome the pressure drop in system 100. There can be equipment such as heat exchangers or flue gas treatment equipment between device 90 and system 100.

In further accordance with the invention, first and second heat exchangers are provided in fluid communication with the valve manifold. The first and second heat exchangers are adapted to exchange energy with a gas stream passing therethrough.

For purposes of illustration and not limitation, as embodied herein and as depicted in FIG. 1, system 100 includes a first heat exchanger 118a and a second heat exchanger 118b. Each heat exchanger 118 is adapted to allow for a gas stream to flow therethrough. Each heat exchanger 118 also includes a heat transfer area 122, which gives the ability to exchange thermal energy with gas streams flowing therethrough.

Heat transfer areas 122 serve one of two functions, with the specific function depending on both the particular cycle/stage of the RSCR process that is occurring, and the particular heat exchanger 118 within which they are located. For example, and as will be described below, the same heat transfer area 122 can provide/transfer heat to an incoming gas, or can extract/transfer heat from an outgoing gas.

According to a currently preferred embodiment of the present invention, and as shown in FIGS. 1-7, each heat exchanger 118 includes one heat transfer area 122 such that the first heat exchanger 118a includes a first heat transfer area 122a and the second heat exchanger 118b includes a second heat transfer area 122b. However, it is possible to practice the invention with more than one heat transfer area 122 in each heat exchanger 118.

The heat transfer areas 122 should be constructed of one or more materials that have a high heat capacity, are capable of both absorbing and releasing heat efficiently, and that allow gas to flow therethrough—that is, each heat transfer area 122 should be constructed of one or more materials that can (a) accept heat from a gas that flows through the heat transfer area 122 if the gas has a higher temperature than the heat transfer area 122, but that can also (b) provide heat to a gas that flows through the heat transfer area 122 if the heat transfer area 122 has a higher temperature than the gas.

Exemplary materials from which heat transfer areas 122 can be made include, but are not limited to ceramic media such as silica, alumina or mixtures thereof, with a currently preferred material being high silica structured media. It should be noted that some or all of the heat transfer areas 122 can, but need not be constructed of the same materials—that is, some but not all of the heat transfer areas can be made of the same combination of materials, or each of the heat transfer areas can be made of a different combination of materials.

Each heat exchanger 118 also has one or more heat producing devices. The heat producing devices can be any of those known in the art, e.g., one or more burners 120. It is currently preferred to locate one or more burners 120 within each heat exchanger 118, especially in an embodiment of the present invention in which the reactant is ammonia. This is because such an arrangement minimizes the risk of undesirably oxidizing ammonia to form additional $NO_X$-containing gas.

The number of burners 120 located within each heat exchanger 118 can vary according to several factors (e.g., the need/degree to alter the temperature of the gas entering or leaving the heat exchanger 118); however, the total number of burners 120 will generally be one per heat exchanger 118. It should be noted that one or more burners 120 can be located in other areas of system 100 in addition to or in lieu of those within heat exchangers 118, with such other areas including but not limited to above or below a heat transfer area 122, or within catalyst chamber 102.

In further accordance with the invention, the valve manifold is adapted to heat a gas stream passing through the system by directing the gas stream through the first heat exchanger, and to cool the gas stream by passing the gas stream through the second heat exchanger during a first cycle. During a second cycle, the valve manifold heats a gas stream passing through the system by directing the gas stream through the second heat exchanger, and cools the gas stream by passing the gas stream through the first heat exchanger.

The system 100 enables regenerative selective catalytic reduction (RSCR) to occur, as shown in FIGS. 2-3, wherein FIG. 2 depicts a first cycle of the process, with arrows indicating the flow path. FIG. 3 similarly depicts a second cycle. The number of cycles that constitute a complete RSCR process can vary in accordance with the present invention, as can the definition of what specifically constitutes a cycle.

A cycle of the RSCR process is generally defined as the time it takes for a given valve, such as valve 114a, to first open to admit gas, go through its complete cycle until it just starts to open again to admit gas. The number of cycles can be predetermined, and, if so, can range from tens of cycles to thousands of cycles. Also, due to the design of system 100, the RSCR process can be substantially ongoing/continuous, whereby there is no fixed number of cycles.

Prior to the commencement of the first cycle of the RSCR process, the heat transfer area 122 with which the $NO_X$-containing gas will first come into contact should be pre-heated to a predetermined temperature. This predetermined temperature is selected such that the $NO_X$-containing gas, once it has passed through that preselected heat transfer area 122, will be within a temperature range that allows for the $NO_X$-containing gas to undergo catalytic reaction upon encountering catalyst area 108 within the catalyst chamber 102. In other words, if the $NO_X$-containing gas will first encounter first heat transfer area 122a, then first heat transfer area 122a should be pre-heated to a temperature whereby the gas, once it has passed through first heat transfer area 122a, is at a temperature that will allow for catalytic reduction to occur when the gas reaches the first catalyst area 108.

In order for catalytic reaction to occur at a catalyst area 108, and according to an exemplary embodiment of the present invention, the $NO_X$-containing gas should be in the temperature range of about 400° F. to about 800° F. upon entering catalyst area 108. Various techniques for pre-heating the heat transfer area 122 with which the gas will first come into contact (i.e., the designated heat transfer area 122) are known to those of ordinary skill in the art. By way of non-limiting example, the temperature of ambient air within system 100 can be raised by activating one, some or all of the burner(s) 120 located within system 100. One or more temperature gauges (not shown) or other temperature assessment devices can be placed within or in communication with the designated heat transfer area 122 to determine whether the heated air/gas has successfully raised the temperature of the designated heat transfer area 122 to the threshold temperature.

A predetermined quantity of one or more reactants should be mixed with the $NO_X$-containing gas destined for system 100 in order to form a mix of $NO_X$-containing gas and reactant. The choice of reactant(s) may vary, provided that the specific reactant(s) allow for the desired catalytic reaction to occur at catalyst areas 108.

Generally, a predetermined quantity of gas that does not contain a reactant is introduced into system 100 prior to the introduction of mixed gas and reactant, wherein the amount of gas that does not contain reactant and/or the duration of time that such non-mixed gas is introduced into system 100 can vary.

The amount/concentration of reactant added to the $NO_X$-containing gas can vary according to several factors, such as the expected concentration of $NO_X$ within the gas prior to its entry into the system 100. In accordance with an exemplary RSCR process of the present invention, the concentration of ammonia introduced to the $NO_X$-containing gas is in the range of about 50 parts per million (ppm) to about 300 ppm.

The reactant(s) can be mixed with or otherwise placed into contact with the $NO_X$-containing gas as is generally known in the art. By way of non-limiting example, a plurality of mixing elements, e.g., static mixers (not shown), can be situated in proximity to a reactant source (not shown) and a gas source (not shown). In operation, the mixing elements cause the $NO_X$-containing gas from the gas source and the reactant from the reactant source to be mixed together as is generally known in the art such that the gas and reactant, once suitably mixed, possess a substantially uniform temperature and concentration.

Immediately after being mixed, the temperature of the mixed gas and reactant is generally in the range of about 200° F. to about 800° F. The concentration of the mixed gas and reactant at that time is generally in the range of about 140 ppm to about 570 ppm.

Once the destined heat transfer area 122 has been pre-heated to a suitable temperature and the reactant(s) has/have been mixed with the $NO_X$-containing gas, the mixed gas and reactant(s) can be introduced into the RSCR system 100 for commencement of the first cycle of the RSCR process.

It is also envisioned that the valve manifold with its various valves 114, conduits 112, and devices 90, as well as burners 120, and other controllable parts of system 100 can be operated by a control system (not pictured), as is well known in the art. The control system can include a computer that controls system 100 based on feedback from temperature sensors and other sensors located within system 100. Such a computer can be programmed with a machine-readable program to control system 100 within desired operational limits, as is known in the art, and to regulate the changes between system cycles, which are described below.

First Cycle of RSCR Process (FIG. 2)

As shown in FIG. 2, and in accordance with a first cycle of the RSCR process of the present invention, the $NO_X$-containing gas enters the valve manifold through conduit 112a and valve 114a. Reactant injector 110, or 110b, introduces a reactant into the gas stream prior to entering heat exchanger 118a. It should be noted that the first cycle can introduce gas first into heat exchanger 118b rather than heat exchanger 118a. However, regardless of which heat exchanger 118 first receives the mixed gas and reactant, the heat transfer area 122 within the heat exchanger 118 should have been pre-heated as explained above.

Generally speaking, and as depicted in FIGS. 1-3, one or more conduits 112 are in communication with each heat exchanger 118 as well as the catalyst chamber 102. Any, or, as is currently preferred, all of these conduits pass through a damper or valve 114 prior to entering a heat exchanger 118 or the catalyst chamber 102.

The number of total valves 114 can vary in accordance with the present invention. For example, although each line/conduit 112 is shown in FIGS. 1-3 as having one valve 114, it is possible in accordance with the present invention for each conduit to have more than one valve/damper, and/or for certain conduits 112 not to have any dampers/valves.

Dampers suitable for use in connection with the present invention include, but are not limited to those sold commercially by Bachmann Industries Inc. of Auburn, Me. And those sold commercially by Effox Inc. of Cincinnati, Ohio. Valves suitable for use in connection with the present invention include, but are not limited to rotary valves, such as VRTO rotary valves sold commercially by Eisenmann Corp, of Crystal Lake, Ill.

Upon entering the first heat exchanger 118a, the mixed gas and reactant flows in a first direction, which, as shown in FIG. 1, is upflow. It is understood, however, that the first direction could be downward, or any other suitable direction. The flow direction of the gas is determined or influenced both by the presence of one or more gas movement influencing devices (e.g., one or more fans), and by which of the various dampers/valves 114 are open.

For example, in order to ensure that the $NO_X$-containing mixed gas and reactant flows in a desired first direction (e.g., upwardly) upon being introduced to the first heat exchanger 118a, valves 114a, 114c, 114e, and 114g are opened and the remaining valves 114b, 114d, 114f, and 114h are closed. Thus, if the gas movement influencing device 90 is actuated (i.e., turned on), then the gas within the apparatus 10 will be drawn toward the open valve 114g via the most direct path. Based on the location of the open valve 114g, this would cause the gas to flow in a first direction (i.e., upwardly) through the first heat exchanger 118a, and then in a second, opposite direction (i.e., downwardly) through the catalyst chamber 102, and then downwardly through second heat exchanger 118b, and finally out towards the flue via conduit 112g, as indicated by the arrows in FIG. 2.

Referring again to the first cycle (as depicted in FIG. 2) of the RSCR process, after the $NO_X$-containing mixed gas and reactant is introduced into first heat exchanger 118a of system 100, the gas encounters first heat transfer area 122a, which, as noted above, is pre-heated to a temperature higher than that of the mixed gas and reactant. As the $NO_X$-containing mixed gas and reactant passes through first heat transfer area 122a, heat from first heat transfer area 122a is transferred to the mixed gas and reactant, thus raising the temperature of the mixed gas and reactant.

Generally, the temperature of first heat transfer area 122a just prior being encountered by the gas is in the range of about 400° F. to about 800° F. The temperature of the gas upon encountering first heat transfer area 122a is generally in the range of about 200° F. to about 400° F.

According to an optional, yet currently preferred embodiment of the first cycle of the present invention, at least one burner 120a is placed within a space near the top of heat exchanger 118a. The presence of at least one burner 120a causes the gas to be reheated to a temperature suitable for the gas to undergo a catalytic reaction at the catalyst area 108. Also, any or all of the at least one burner 120 can be activated to provide additional heat to the apparatus, and, in particular, to one or more of the heat transfer areas 122. The temperature of the burner 120a upon the gas encountering it is generally in the range of about 900° F. to about 1600° F.

After the mixed gas and reactant has passed through or over first heat transfer area 122a, it proceeds (flows) in the same direction (i.e., upflow in the embodiment depicted in FIG. 2) out of first heat exchanger 118a, through valve 114c, and into catalyst chamber 102. Because the temperature of the mixed gas and reactant has been raised at first heat transfer area 122a, catalytic reactions are able to occur at catalyst areas 108. Exemplary such reactions are shown below, wherein it is noted that other reactions may occur in lieu of or in addition to those listed. The reactions that take place are effective to cause $NO_X$ within the mixed $NO_X$-containing gas and reactant to be entirely or at least partially converted to harmless constituent gases:

$$4NO + 4NH_3 + O_2 \longrightarrow 4N_2 + 6H_2O$$

$$2NO_2 + 4NH_3 + O_2 \longrightarrow 3N_2 + 6H_2O$$

Certain side reactions also may occur during the catalysis process, such as:

$$6NO_2 + 8NH_3 \longrightarrow 7N_2 + 12H_2O$$

$$NO + NO_2 + 2NH_3 \longrightarrow 2N_2 + 3H_2O$$

Upon departing catalyst chamber 102, the treated gas flows through open valve 114e, and then enters second heat exchanger 118b. Once within second heat exchanger 118b, the gas flows in an opposite direction as compared to the direction of flow in first heat exchanger 118a. According to a currently preferred embodiment of the first cycle of the present invention, the direction of flow in first heat exchanger 118a is upflow and the direction of flow in second chamber 118b is downflow. However, it should be noted that the gas can flow in any direction in first and second heat exchangers 118 during the first cycle of the invention.

When the gas arrives at the second heat transfer area 122b, the temperature of second heat transfer area 122b will be less than that of the gas. Thus, as the gas passes through second heat transfer area 122b, heat from the gas is transferred to second heat transfer area 122b to raise the temperature of second heat transfer area 122b. Generally, the temperature of second heat transfer area 122b just prior to being encountered by the gas is in the range of about 350° F. to about 750° F., whereas the temperature of second heat transfer area 122b just after heat has been transferred thereto by the gas flowing therethrough is generally in the range of about 500° F. to about 800° F.

The temperature of the gas upon encountering second heat transfer area 122b is generally in the range of about 420° F. to about 750° F., whereas the temperature of the gas upon departing second heat transfer area 122b after having transferred heat to second heat transfer area 122b is generally in the range of about 215° F. to about 415° F.

After flowing through second heat transfer area 122b, the gas flows out of second heat exchanger 118b, through conduit 112g and valve 114g with the gas movement influencing device 90 being actuated (i.e., turned on). The gas is then eventually released into the atmosphere through an expulsion area (e.g., a stack). The concentration of reactant in the gas stream after undergoing the first cycle is generally less than about 2 parts per million.

Because the treated gas has transferred heat to second heat transfer area 122b, the temperature of the gas will be similar or approximately equal to its temperature upon first entering system 100 for treatment. This is beneficial because it allows for very little energy loss in the RSCR system.

Moreover, because the treated gas does not emerge at an elevated temperature as compared to its temperature when it entered system 100, the expulsion area need not be constructed of specialized materials. In some "tail end" SCR systems, the gas emerges at a comparatively higher temperature, such that the expulsion area is required to be made of specialized materials that can withstand the higher temperature gas. In contrast, no modifications to the design of existing expulsion areas or to the materials from which they are constructed are required in accordance with the present invention.

The duration of the first cycle should be as long as possible, however, it should not continue beyond a point in which heat transfer areas 122 are outside of their desired operating temperature ranges, which would reduce the energy efficiency of system 100. It is currently preferred that the first cycle last for a duration from about one minute to more than three minutes, with about three and one half minutes being most preferable.

Second Cycle of RSCR Process (FIG. 3)

Following completion of the first cycle of the RSCR process, the second cycle is commenced whereby additional $NO_X$-containing gas enters the RSCR system 100 for treatment. There is no set time frame for commencing the second cycle after the completion of the first cycle; however, it is currently preferred to commence the second cycle within about three minutes of completion of the first cycle. This is because if there is temporal proximity between the completion of the first cycle and the commencement of the second cycle, then the process can utilize the benefits of the residual heat that remains in second heat transfer area 122b following the completion of the first cycle.

The purpose of the second cycle is the same as that of the first cycle, namely to remove contaminants (e.g., $NO_X$) from gas entering system 100. Prior to the commencement of the second cycle, reactant (e.g., $NH_3$) is mixed with the gas. The mixing process, equipment and conditions are generally identical to those performed prior to the first cycle of the process. However, in the second cycle of the invention, mixed gas and reactant is supplied to second heat exchanger 118b of system 100 via conduit 112h and valve 114h such that the mixed gas and reactant first encounters the residually-heated second heat transfer area 122b.

Upon entering the second heat exchanger 118b, the mixed gas and reactant flows in a first direction, which, as shown in FIG. 3, is upflow. It is understood, however, that the first direction could be downward, or any other suitable direction. The flow direction of the gas is determined or influenced both by the presence of one or more gas movement influencing devices 90 (e.g., one or more fans), and by which of the various dampers/valves 114 are open.

For example, in order to ensure that the $NO_X$-containing mixed gas and reactant flows in a desired first direction (e.g., upwardly) upon being introduced to the second heat exchanger 118b, valves 114a, 114c, 114e, and 114g are closed and the remaining valves 114b, 114d, 114f, 114h are opened. Thus, if the gas movement influencing device 90 is actuated (i.e., turned on), then the gas within system 10 will be drawn toward the device 90 through valve 114b via the most direct path. Based on the location of the device 90, this would cause the gas to flow in a first direction (i.e., upwardly) through second heat exchanger 118b, and then in a second, opposite direction (i.e., downwardly) through catalyst chamber 102, and then downwardly through first heat exchanger 118a, and finally out towards the flue via conduit 112b, as indicated by the arrows in FIG. 3.

Referring again to the second cycle (as depicted in FIG. 3) of the RSCR process, after the $NO_X$-containing mixed gas and reactant is introduced into second heat exchanger 118b of system 100, the gas encounters second heat transfer area 122a, which, as noted above, is heated to a temperature higher than that of the mixed gas and reactant. As the $NO_X$-containing mixed gas and reactant passes through second heat transfer area 122b, heat from second heat transfer area 122b is transferred to the mixed gas and reactant, thus raising the temperature of the mixed gas and reactant.

Generally, the operating temperatures of the second cycle are the same as the corresponding operating temperatures in the first cycle described above. After the mixed gas and reactant has passed through or over second heat transfer area 122b, it proceeds (flows) in the same direction (i.e., upflow in the embodiment depicted in FIG. 3) out of second heat exchanger 118b, through valve 114f, and into catalyst chamber 102. Because the temperature of the mixed gas and reactant has been raised at second heat transfer area 122b, catalytic reactions are able to occur at catalyst areas 108. Exemplary such reactions are described above in association with the first cycle.

Upon departing catalyst chamber 102, the treated gas flows through open valve 114d, and then enters first heat exchanger 118a. Once within first heat exchanger 118a, the gas flows in an opposite direction as compared to the direction of flow in second heat exchanger 118b. According to a currently preferred embodiment of the first cycle of the present invention, the direction of flow in second heat exchanger 118b is upflow and the direction of flow in first chamber 118a is downflow. However, it should be noted that the gas can flow in any direction in first and second heat exchangers 118 during the second cycle of the invention.

When the gas arrives at the first heat transfer area 122a, the temperature of first heat transfer area 122a will be less than that of the gas. Thus, as the gas passes through first heat transfer area 122a, heat from the gas is transferred to first heat transfer area 122a to raise the temperature of first heat transfer area 122a. Generally, the temperature of first heat transfer area 122a just prior to being encountered by the gas is in the range of about 550° F. to about 750° F., whereas the temperature of first heat transfer area 122a just after heat has been transferred thereto by the gas flowing therethrough is generally in the range of about 600° F. to about 800° F.

The temperature of the gas upon encountering first heat transfer area 122a generally in the range of about 300° F. to about 800° F., whereas the temperature of the gas upon departing the first heat transfer area 122a after having transferred heat to first heat transfer area 122a is generally in the range of about 215° F. to about 415° F. After flowing through first heat transfer area 122a, the gas flows out of first heat exchanger 118a, through conduit 112b and valve 114b with the gas movement influencing device 90 being actuated (i.e., turned on). The gas is then eventually released into the atmosphere through an expulsion area (e.g., a stack). The concentration of reactant in the gas stream after undergoing the first cycle is generally less than about 2 parts per million.

As in the first cycle, since the treated gas has transferred heat into the first heat transfer area 122a, the temperature of the gas will be similar or approximately equal to its temperature upon first entering the system 100 for treatment.

The duration of the first cycle should be as long as possible, however, it should not continue beyond a point in which heat transfer areas 122 are outside of their desired operating temperature ranges, which would reduce the energy efficiency of system 100. It is currently preferred that the cycle duration last from about one to more than three minutes.

Subsequent Cycles

If there are subsequent cycles of the RSCR process, they would be patterned after the first and second cycles. Since there is residual heat in first heat transfer area 122a following completion of the second cycle, a third cycle—if it were to occur—would proceed identically to the first cycle, except for the fact that first heat transfer area 122a was initially preheated prior to the commencement of the first cycle, whereas it already possesses residual heat prior to the commencement of the third cycle.

Also, because there would be residual heat in second heat transfer area 122b following completion of the third cycle of the RSCR process, a fourth cycle—if it were to occur—would proceed identically to the second cycle, which introduced gas into second heat exchanger 118b to encounter the pre-heated second heat transfer area 122b.

Moreover, if they were to occur, subsequent even numbered cycles would be identical to the second cycle, and subsequent odd numbered cycles would be identical to the third cycle. Therefore, the terms "first cycle" and "second cycle" can be used generically for odd and even numbered cycles, respectively. System 100 could be continually operated/utilized in accordance with an RSCR process having a plurality or multiplicity of cycles.

OTHER ASPECTS OF THE INVENTION

According to an alternative embodiment of the present invention, and during any or all of the cycles of the RSCR process, one or more reactants can be introduced directly into one of the chambers of the RSCR system 100 in lieu of or in addition to the reactant that is supplied upstream of (i.e., outside of) the; apparatus. If that occurs, it is currently preferred to introduce the one or more reactants at a location between a heat transfer area 122 and a catalyst area 108. For example, FIGS. 1-3 show an alternative location 110b for introduction of reactant that can serve this purpose. Various techniques and equipment known to one of ordinary skill in the art are suitable for introducing the one or more reactants at that location, with such techniques including, but not limited to introducing the reactant(s) via a grid.

According to another alternative embodiment of the present invention, one or more of the catalyst areas 108 can include multiple layers/beds, such that the catalyst area(s) 108 can function as a two-step catalyst to enable reduction of harmful contaminants in addition to (or in lieu of) $NO_X$. According to such an embodiment, and by way of non-limiting example, one or more the catalyst areas 108 can include a layer or bed of at least one oxidation catalyst in order to cause reduction of carbon monoxide and/or so-called volatile organic compounds (VOCs). An exemplary oxidation catalyst is a precious metal oxidation catalyst.

The RSCR process of the present invention enjoys several important advantages as compared to conventional selective catalytic reduction (SCR) processes. For example, per-cycle $NO_X$ reductions of over 90% have been observed in accordance with the present invention. This represents a marked improvement over the 75% reduction rate that is generally regarded as the highest reduction rate for conventional SCR processes.

Another advantage enjoyed by the present invention over conventional SCR processes stems from the fact that the each cycle of the RSCR process of the present invention entails the $NO_X$-containing gas gaining thermal energy one heat exchanger 118 of the RSCR apparatus, then later returning much of the thermal energy to a different heat exchanger 118. As such, the RSCR process of the present invention allows for levels of heat transfer and heat recovery that are unheard of for conventional SCR processes, which call for unidirectional gas flow, and which, therefore, must rely upon additional equipment (such as tubular plates, heat exchangers or other indirect heating equipment) to effect suitable levels of heat transfer. Such extra equipment adds a great deal of capital and operating expense to the process due to the space it occupies and the energy usage it requires.

Moreover, the design of the RSCR system 100 has substantially reduced the amount of reactant slip. For example, when ammonia is used as the reactant that is added to the $NO_X$-containing gas, excessively high levels of ammonia slip have not been observed despite the ability to remove high concentrations of $NO_X$. This is due, at least in part, to the fact that the $NO_X$-containing gas mixed with ammonia moves in the same direction through catalyst chamber 102 in every cycle in accordance with the RSCR process of the present invention. It is a highly important benefit of the present invention to be able to ensure high levels of $NO_X$ reduction while not encountering excessively high ammonia slip levels.

In accordance with another aspect of the invention, a process of for regenerative selective catalytic reduction is provided. The process includes providing a gas stream to be treated containing $NO_X$, introducing a reactant into the gas stream, and directing the gas stream into contact with a catalyst to cause at least some of the $NO_X$ contained in the gas stream to be reduced, wherein the gas stream is adapted to flow past the catalyst along the same flow direction throughout the process in a substantially continuous manner. The gas stream is heated by directing the gas stream through a first heat exchanger, and the gas stream is cooled by directing the gas steam through a second heat exchanger during a first system cycle. During a second system cycle, the gas stream is heated by directing the gas stream through the second heat exchanger, and the gas stream is cooled by directing the gas stream through the first heat exchanger.

For purposes of illustration and not limitation, as embodied herein and as depicted in FIGS. 1-7, the process of the invention is described in detail above in conjunction with the description of systems 100 and 200.

The processes and systems of the present invention, as described above and shown in the drawings, provide for a RSCR process and system with superior properties including high energy efficiency and low reactant slip. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A regenerative selective catalytic reduction process, comprising:
   a) providing a gas stream to be treated containing $NO_X$;
   b) introducing a reactant into the gas stream;
   c) directing the gas stream into contact with a catalyst to cause at least some of the $NO_X$ contained in the gas stream to be reduced, wherein the gas stream is adapted to flow past the catalyst along the same flow direction throughout the process in a substantially continuous manner wherein:
      i) the gas stream is heated by directing the gas stream through a first heat exchanger, and the gas stream is cooled by directing the gas stream through a second heat exchanger during a first system cycle, and
      ii) the gas stream is heated by directing the gas stream through the second heat exchanger, and the gas stream is cooled by directing the gas stream through the first heat exchanger during a second system cycle.

2. The process of claim 1, wherein the gas stream is heated prior to directing the gas stream into contact with the catalyst during each system cycle.

3. The process of claim 2, wherein the reactant is introduced after heating the gas.

4. The process of claim 2, wherein the reactant is introduced before heating the gas.

5. The process of claim 2, wherein each heat exchanger includes a thermal mass.

6. The process of claim 2, wherein the gas stream is further heated by mixing it with combustion products from a burner after it obtains heat energy from a heat exchanger.

7. The process of claim 1, wherein the gas stream is cooled after the gas stream has been directed into contact with the catalyst.

8. The process of claim 1, wherein the reactant injection is continuous.

9. The process of claim 1, wherein the reactant includes at least one of ammonia and ammonium hydroxide.

10. The process of claim 1, wherein the gas stream includes reactant in an amount less than about ten parts per million after the gas stream has undergone the first system cycle.

11. The process of claim 1, wherein the gas stream includes reactant in an amount less than about eight parts per million after the gas stream has undergone the first system cycle.

12. The process of claim 1, wherein the gas stream includes reactant in an amount less than about six parts per million after the gas stream has undergone the first system cycle.

13. The process of claim 1, wherein the gas stream includes reactant in an amount less than about four parts per million after the gas stream has undergone the first system cycle.

14. The process of claim 1, wherein the gas stream includes reactant in an amount of about two parts per million after the gas stream has undergone the first system cycle.

15. A system for regenerative selective catalytic reduction, comprising:
   a) a catalyst chamber having an inlet, an outlet and defining a flow path between the inlet and the outlet, the catalyst chamber containing a catalyst for reducing NO in a gas stream passing therethrough;
   b) a reactant injector in fluid communication with the system for introducing a reactant into the gas stream upstream from the catalyst chamber as the gas stream passes through the system;
   c) a valve manifold in fluid communication with the inlet and the outlet of the catalyst chamber, wherein the valve manifold is adapted to direct a substantially continuous gas stream through the catalyst chamber from the inlet to the outlet during each cycle of system operation along the same flow direction;

d) a first heat exchanger in fluid communication with the valve manifold, the first heat exchanger adapted to exchange energy with a gas stream passing therethrough; and e) a second heat exchanger in fluid communication with the valve manifold, the second heat exchanger adapted to exchange energy with a gas stream passing therethrough;

f) wherein the valve manifold is further adapted to:
   i) heat a gas stream passing through the system by directing the gas stream through the first heat exchanger, and cool the gas stream by passing the gas stream through the second heat exchanger, during a first system cycle; and
   ii) heat a gas stream passing through the system by directing the gas stream through the second heat exchanger, and cool the gas stream by passing the gas stream through the first heat exchanger, during a second system cycle.

16. The system of claim 15, wherein each system cycle is from about one minute to four minutes in duration.

17. The system of claim 15, wherein the reactant injector is adapted to inject reactant into a gas stream passing through the system proximate the inlet of the catalyst chamber.

18. The system of claim 15, wherein each of the first heat exchanger and second heat exchanger comprises a burner and a vessel including a thermal mass adapted to permit a gas stream to pass therethrough.

19. The system of claim 18, wherein the heater includes at least one of a gas burner, a liquid fuel burner, and a steam heater.

20. The system of claim 15, further comprising third and fourth heat exchangers in fluid communication with the valve manifold, the third and fourth heat exchangers adapted to exchange energy with a gas stream passing therethrough.

* * * * *